United States Patent

Salts

[11] Patent Number: 5,960,746
[45] Date of Patent: Oct. 5, 1999

[54] RIGID DOG GROOMING RESTRAINT

[76] Inventor: Nancy L. Salts, 20 Hunt Rd., Picayune, Miss. 39466

[21] Appl. No.: 09/102,404

[22] Filed: Jun. 23, 1998

[51] Int. Cl.$^6$ ............................ A01K 15/04; A01K 13/00
[52] U.S. Cl. .............................................................. 119/756
[58] Field of Search ...................................... 119/753, 756, 119/757, 725, 728, 673, 754, 755

[56] References Cited

U.S. PATENT DOCUMENTS

| | | |
|---|---|---|
| D. 371,871 | 7/1996 | Allamby . |
| 2,773,477 | 12/1956 | Michael ................................ 119/756 |
| 2,804,845 | 9/1957 | Plumley et al. . |
| 3,092,079 | 6/1963 | Strebel et al. . |
| 3,120,836 | 2/1964 | Brauning . |
| 3,208,432 | 9/1965 | Fisk ..................................... 119/756 |
| 3,250,252 | 5/1966 | Leoplod . |
| 3,524,434 | 8/1970 | Finley .................................. 119/756 |
| 3,580,222 | 5/1971 | Dunn . |
| 4,003,341 | 1/1977 | La Croix . |
| 4,041,905 | 8/1977 | Prager et al. . |
| 4,186,690 | 2/1980 | Seiler . |
| 4,570,577 | 2/1986 | Bellinger . |
| 5,178,098 | 1/1993 | Samberg . |
| 5,243,931 | 9/1993 | McDonough . |
| 5,279,257 | 1/1994 | Temby . |

*Primary Examiner*—Michael J. Carone
*Assistant Examiner*—James S. Bergin
*Attorney, Agent, or Firm*—John D. Gugliotta

[57] ABSTRACT

Disclosed is a rigid dog grooming restraint used to secure dogs in a stationary position while performing grooming operations. The rigid dog grooming restraint attaches to most grooming tables and consists of a frame from which several dog restraining devices are adjustably attached. The dog restraining devices are designed to secure the animal by its neck, chest or haunch and can be configured to secure the animal in a variety of positions.

7 Claims, 6 Drawing Sheets

RIGID DOG GROOMING RESTRAINT

BACKGROUND OF THE INVENTION

1. Field of the Invention

The present invention relates generally to pet accessories and, more particularly, to a restraint for use while grooming dogs that is rigid in design, maintaining the animal in a fixed position during grooming operations.

2. Description of the Related Art

With the growing number of households owning pets, it is becoming increasingly popular to send one's dog to a pet grooming service in order to have its hair cut, shampooed and styled, nails trimmed, etc. These pet grooming establishments are staffed by professional personnel that utilize specialized equipment to carry out the many different procedures involved. Among the special equipment used, various anchoring devices, such as straps, support frames and collars, are used to secure the animal to the tables and platforms upon which the procedures are carried out, thereby limiting their movement. These restraining mechanisms are necessary for the safety of both the dog and the grooming personnel, preventing injury from the sharp devices sometimes used in hair cutting and nail trimming. Furthermore, the immobility of the dog is essential in providing a uniform, quality haircut. The device must be capable of immobilizing the dog's head, chest, and haunch areas separately and permit access to the animal's entire body so that it can be groomed properly.

In the ancillary art, several devices have been developed that somewhat immobilize the dog during grooming and veterinary procedures. U.S. Pat. No. 4,041,905, issued in the name of Prager et al., U.S. Pat. No. 4,186,690, issued in the name of Seiler, U.S. Pat. No. 5,178,098, issued in the name of Samberg, and U.S. Pat. No. 5,279,257, issued in the name of Tremby, disclose dog grooming restraining devices wherein the animal is restrained to the work surface by a flexible neck collar secured to a rigid grooming table member. The devices are adjustable so as to accept animals of varying size and height. These devices are somewhat effective in immobilizing the animal's head and neck, however they do permit some movement due to the non-rigid characteristics of the strap itself. Furthermore, they fail to restrain the remainder of the animal's body and, as a result, the dog is permitted to move the majority of its body while secured in these devices.

U.S. Pat. No. 4,570,577, issued in the name of Bellinger, discloses an animal restraining device wherein a rigid support frame is attached to the grooming table. The dog is restrained by a strap, hanging from the frame above the animal, that is secured around the dog's abdomen. The strap is adjustable in length so as to accommodate animals of varying size and height. This device is somewhat effective in immobilizing the animal's mid-section, however it does permit some movement due to the non-rigid characteristics of the strap itself. Furthermore, it does permit significantly unrestricted movement of the head, front and rear portion of the animal.

U.S. Pat. No. 5,243,931, issued in the name of McDonough, discloses an animal restraining device wherein the dog is restrained by a pair of straps secured to the surface beneath the animal. The straps secure the animal around the abdomen and around its chest. The straps are adjustable in length so as to accommodate animals of varying size and height. This device is somewhat effective in immobilizing the animal's mid-section, however it does permit some movement due to the non-rigid characteristics of the strap itself. Furthermore, it does permit significantly unrestricted movement of the head. Finally, due to the fact that the straps are secured underneath the dog, it also permits the animal to sit or lie down while secured by the device.

U.S. Pat. No. 3,580,222, issued in the name of Dunn, discloses an animal restraining device wherein a rigid support frame is attached to the ceiling directly above the grooming table. Suspended from the frame are three straps that are used to restrict the movement of the animal. The straps can be used in a variety of configurations, attaching to the dog's neck, legs, haunch and chest. The straps are adjustable in length so as to accommodate animals of varying size and height. This device is somewhat effective in immobilizing the animal, however it does permit some movement due to the non-rigid characteristics of the straps themselves and, depending upon the configuration, may permit totally unrestricted movement in one or more areas.

U.S. Pat. No. 3,092,079, issued in the name of Strebel et al., discloses an animal restraining device wherein a rigid support frame is attached to the grooming table. The frame includes an elongated U-shaped support mounted to an adjustable height pole into which the dog's mid-section is placed and strapped. This device appears to be effective in immobilizing the animal's mid-section, however it does permit significantly unrestricted movement of the head, front and rear portion of the animal. Furthermore, the U-shaped support prohibits any grooming procedures in a substantially large portion of the animal's mid-section.

U.S. Pat. No. 3,120,836, issued in the name of Brauning, discloses an animal restraining device wherein a rigid support frame is attached to the grooming table. The frame includes an elongated U-shaped support mounted to an adjustable height pole into which the dog's mid-section is placed and strapped. Also, a separate, adjustable frame supports a collar for securing the animal's neck. This device appears to be effective in immobilizing the animal's mid-section and substantially immobilizing its head and neck, however it does permit significantly unrestricted movement of the front and the rear portion of the animal. Furthermore, the U-shaped support prohibits any grooming procedures in a substantially large portion of the animal's mid-section.

U.S. Pat. No. 3,250,252, issued in the name of Leopold, discloses a veterinary animal restraining device wherein a rigid support frame is attached to the grooming table. The frame includes three elongated U-shaped supports mounted to adjustable height poles, each of which extend vertically from a frame that attaches to the surface of a table. The dog's head, chest and haunch each fit into one of the U-shaped supports and are secured therein via a strapping mechanism. This device appears to be effective in immobilizing the dog's body, however it does not allow for selective immobilization of the animal. Furthermore, the U-shaped supports and the surface-mounted frame can prohibit grooming procedures in a substantially large portion of the animal's mid-section and chest area.

U.S. Pat. No. 2,804,845, issued in the name of Plumley et al., discloses a veterinary animal restraining device wherein a rigid support frame is attached to the grooming table. The frame includes two U-shaped supports and a muzzle mounted to adjustable height poles that extend from a frame that attaches to the surface of a table. The dog's snout fits into the muzzle and the neck and haunch each fit into one of the U-shaped supports and are secured therein via a strapping mechanism. This device appears to be effective in immobilizing the dog's body, however it does not allow for selective immobilization of the animal. Furthermore, the U-shaped supports and the surface-mounted frame can prohibit grooming procedures in a substantially large portion of the animal's frontal mid-section and chest area.

A search of the previous art did not disclose any patents that read directly on the claims of the instant invention. Consequently, a need has been felt for providing a rigid dog grooming restraint that is adjustable, provides selective immobilization of the various body parts of the dog, and is designed so as to allow full access to the dog for grooming purposes.

SUMMARY OF THE INVENTION

Briefly described according to a preferred embodiment, the present invention consists of a frame that attaches to opposite ends of a table top with a vertical pole extending from each end and a support bar traversing in between in a manner such that it can be adjusted to a variable height. A haunch support, consisting of a U-shaped support with a strapping mechanism, extends vertically down from the support bar on an extension rod and is adjustable vertically, horizontally, axially about the support bar and axially and telescopically about the longitudinal axis of haunch support extension rod. A combined support for the head, neck and chest consisting of an interchangeable U-shaped support with a strapping mechanism and a flexible collared lead extends down from the support bar on an extension rod. The combined support is adjustable vertically, horizontally, axially about the support bar, axially and telescopically about the extension rod and features a swivelling mechanism, connecting the U-shaped support to the extension rod, that provides 360 degree rotation in virtually every plane about the swivel.

It is therefore an object of the present invention to provide a rigid dog grooming restraint that is adjustable so as to accommodate a wide variety of animal sizes.

It is another object of the present invention to provide a rigid dog grooming restraint that provides rigid support to the animal's head, neck, chest and haunch areas.

It is another object of the present invention to provide a rigid dog grooming restraint that provides rigid support selectively to the animal's head, neck, chest and haunch areas.

It is another object of the present invention to provide a rigid dog grooming restraint that provides for the use of a non-rigid restraining means, such as a tethered collar, to secure the animal.

It is another object of the present invention to provide a rigid dog grooming restraint that is adjustable so as to adapt and attach to a variety of dog grooming tables or other tables used for dog grooming purposes.

It is another object of the present invention to provide a rigid dog grooming restraint that allows the grooming personnel to access the entire body of the animal in order to groom it properly.

It is another object of the present invention to provide a rigid dog grooming restraint that provides safety to both the animal and the grooming personnel during grooming operations and procedures.

It is another object of the present invention to provide a rigid dog grooming restraint that is easy to use and adjust with locking screw-type fasteners.

It is another object of the present invention to provide a rigid dog grooming restraint that is simple in design so as to facilitate a cost effective manufacturing process.

Finally, it is an object of the present invention to provide a rigid dog grooming restraint that is constructed of strong, durable materials so as to withstand repetitive commercial use.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

LIST OF REFERENCE NUMBERS

10 Rigid Dog Grooming Restraint
11 Grooming Table
12 C-Clamps
15 End Support Bar Sleeve
16 Left End Support Bar
17 Right End Support Bar
18 End Support Bar Locking Handle
20 Left Traversing Support Bar Sleeve
21 Left Traversing Support Bar
22 Left Traversing Support Bar Sleeve Locking Handle
25 Right Traversing Support Bar Sleeve
26 Right Traversing Support Bar
27 Right Traversing Support Bar Sleeve Locking Handle
30 Left Traversing Support Bar Locking Handle
35 Haunch-Chest Holder Support
36 Haunch-Chest Holder Telescoping/Radial Adjustment Sleeve
37 Haunch-Chest Holder Linear/Radial Adjustment Sleeve
38 Haunch-Chest Holder Linear/Radial Adjustment Sleeve Locking Handle
39 Haunch-Chest Holder Support Bar
40 Haunch-Chest Holder Telescoping/Radial Adjustment Sleeve Locking Handle
45 Haunch-Collar Holder Support
46 Haunch-Collar Holder Telescoping/Radial Adjustment Sleeve
47 Haunch-Collar Holder Linear/Radial Adjustment Sleeve
48 Haunch-Collar Holder Linear/Radial Adjustment Sleeve Locking Handle
49 Haunch-Collar Holder Support Bar
50 Haunch-Collar Holder Telescoping/Radial Adjustment Sleeve Locking Handle
55 Haunch-Chest Holder
56 Haunch-Chest Holder Frame
57 Haunch-Chest Holder Frame Pad
58 Strapping Apertures 59 Securing Strap
60 Strap Aperture Securing Post
65 Haunch-Collar Holder
66 Haunch-Collar Holder Angular Adjustment Joint
67 Haunch-Collar Holder Angular Sleeve
68 Haunch-Collar Holder Extension Rod
69 Haunch-Collar Holder Frame
70 Haunch-Collar Holder Frame Pad
75 Angular Adjustment Disc
76 Angular Adjustment Support
77 Haunch-Collar Holder Angular Adjustment Locking Handle
78 Haunch-Collar Holder Support Bar Base
79 Haunch-Collar Holder Angular Sleeve Locking Handle
85 Noose Holder
86 Noose Holder Support Bar
87 Noose Holder Ring

DESCRIPTION OF THE PREFERRED EMBODIMENTS

In order to describe the complete relationship of the invention, it is essential that some description be given to the manner and practice of functional utility and description thereof. Accordingly, the best mode for carrying out the invention is presented in terms of its preferred embodiment, herein depicted within the figures.

1. Detailed Description of the Figures

Figure 1:
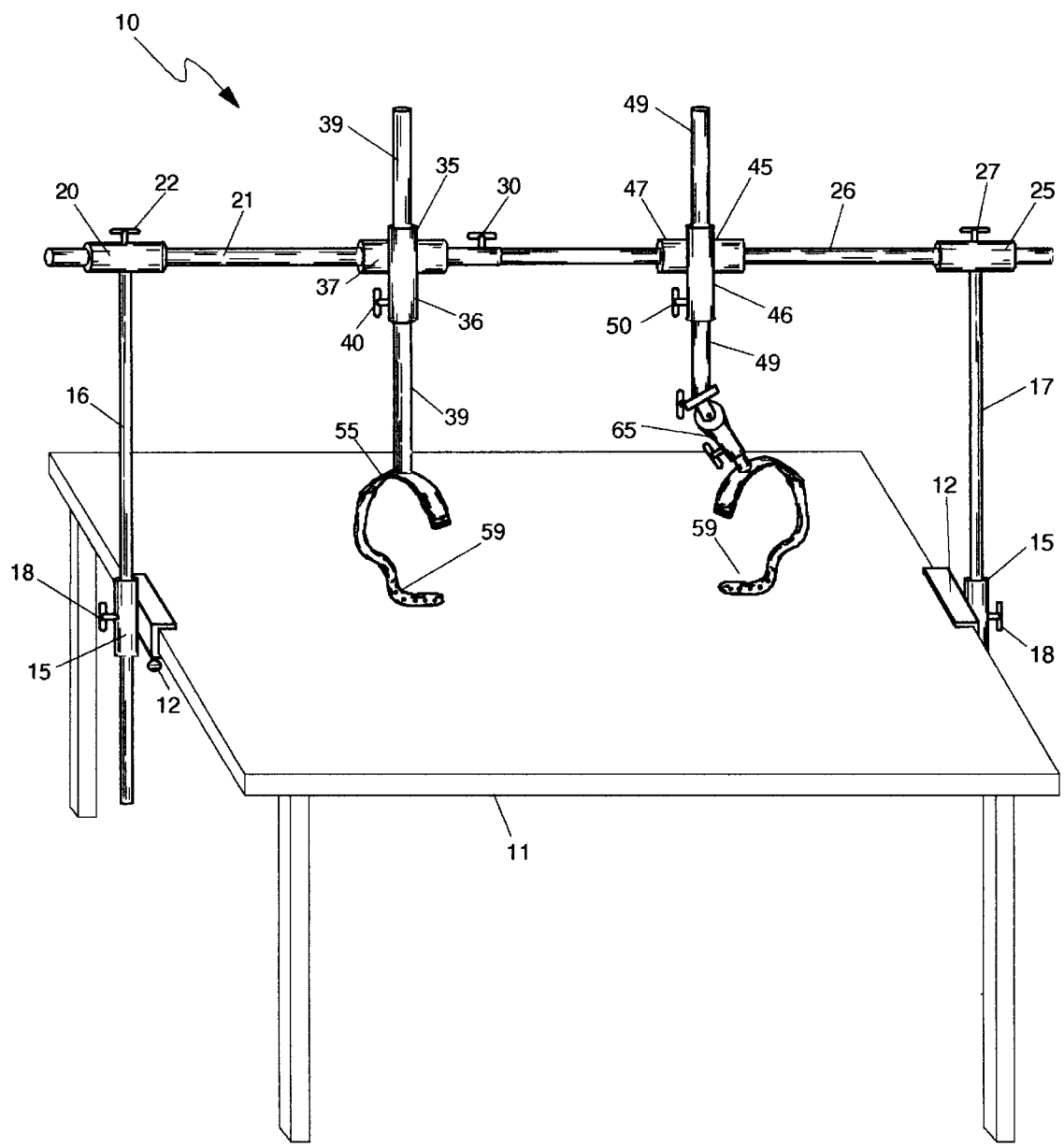
FIG. 1 is a front perspective view of a rigid dog grooming restraint according to the preferred embodiment of the present invention.
Figure 2:
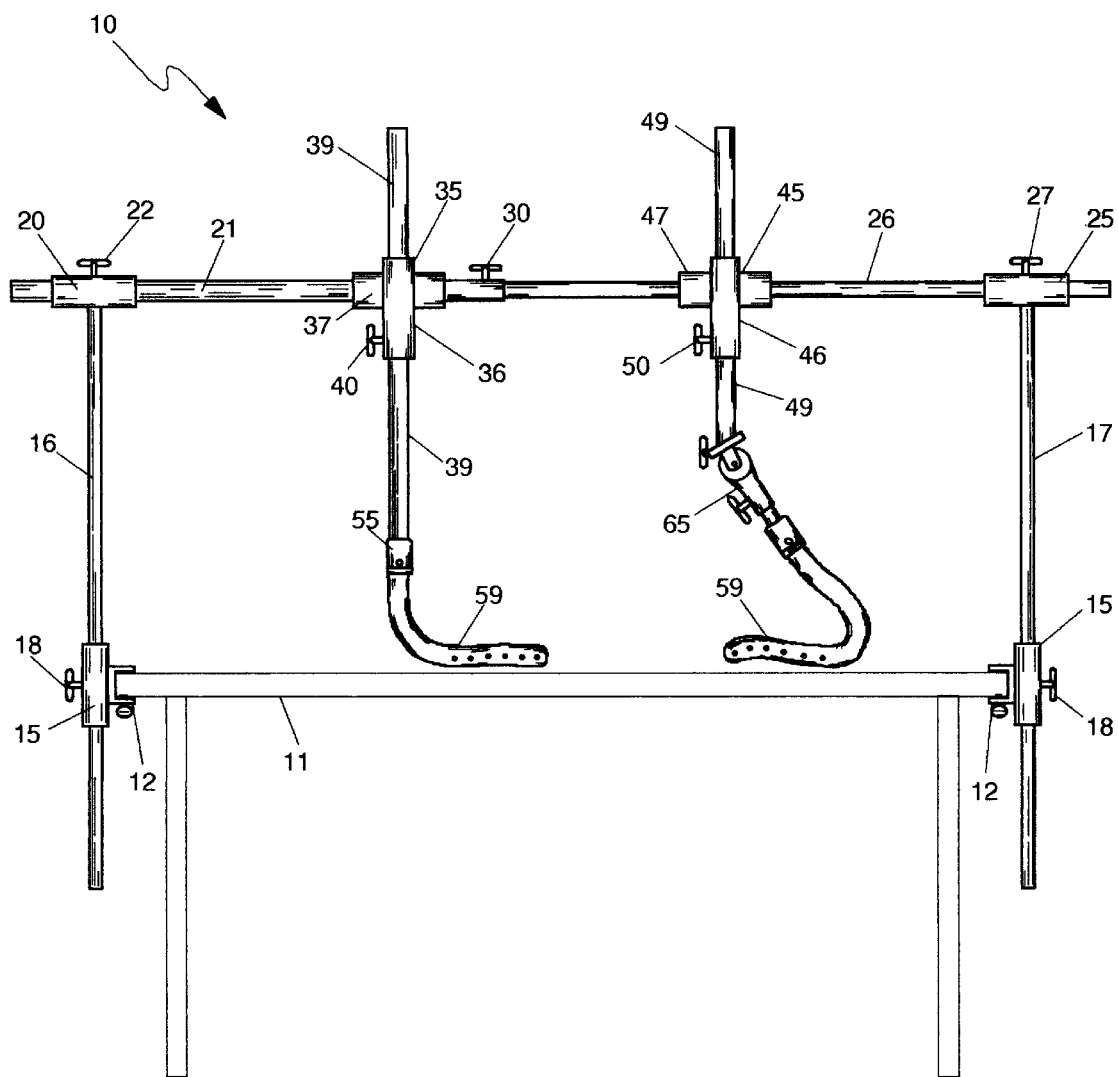
FIG. 2 is a front view of a rigid dog grooming restraint according to the preferred embodiment of the present invention.
Figure 3:
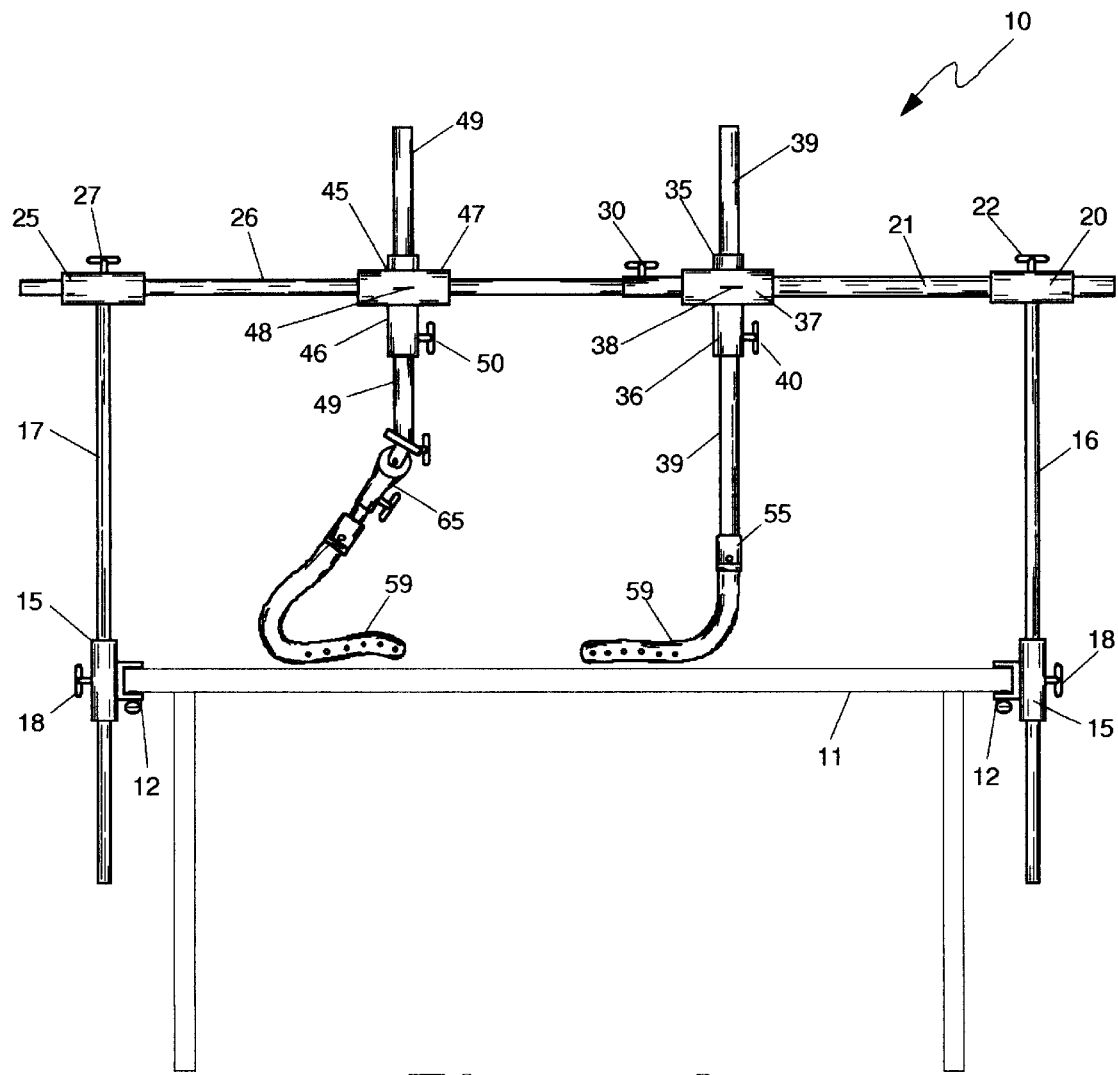
FIG. 3 is a rear view of a rigid dog grooming restraint according to the preferred embodiment of the present invention.
Figure 4:
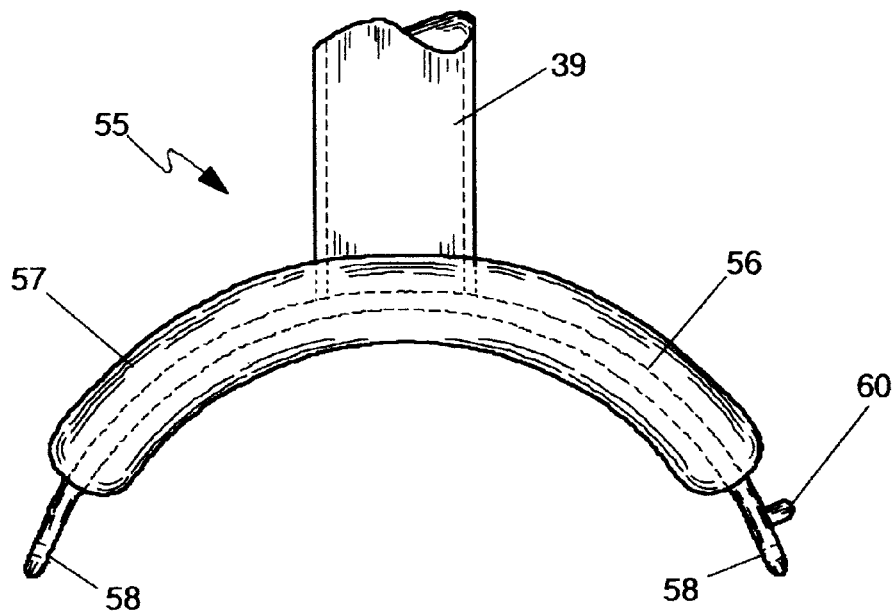
FIG. 4 is a front view of a haunch-chest holder for use with a rigid dog grooming restraint according to the preferred embodiment of the present invention.
Figure 5:
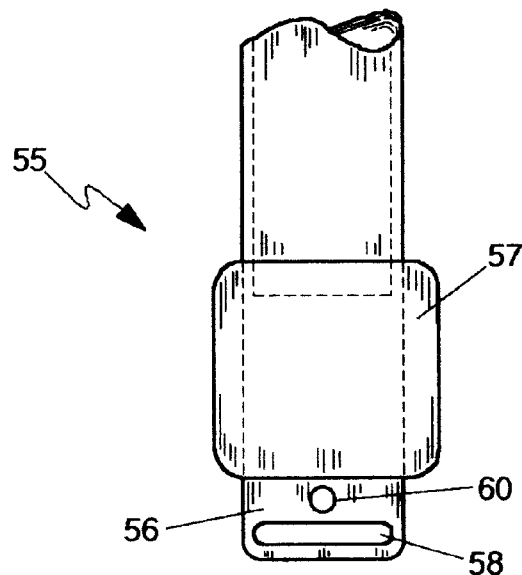
FIG. 5 is a side view of a haunch-chest holder for use with a rigid dog grooming restraint according to the preferred embodiment of the present invention.
Figure 6:
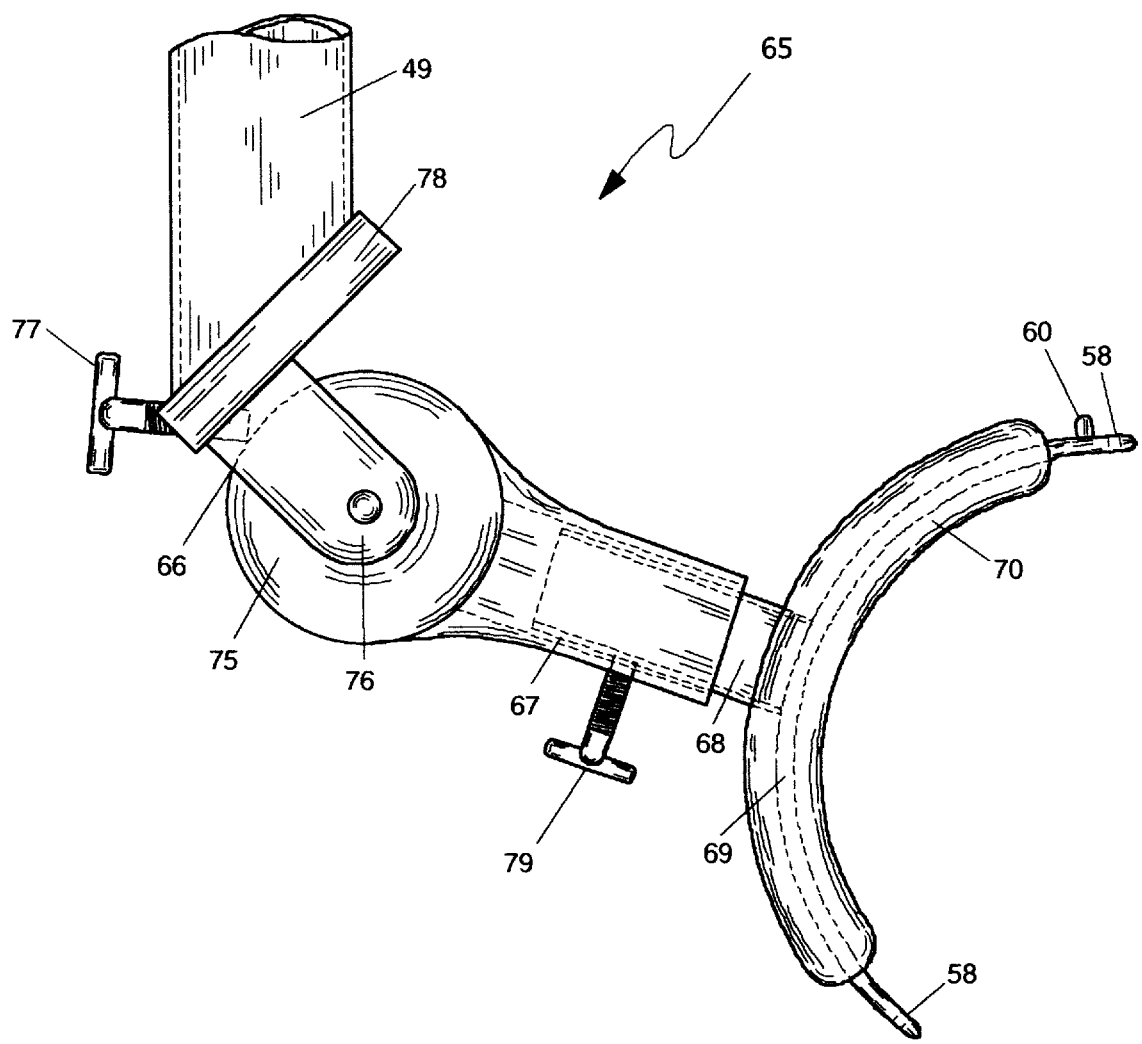
FIG. 6 is a profile view a haunch-collar holder for use with a rigid dog grooming restraint according to the preferred embodiment of the present invention.
Figure 7:
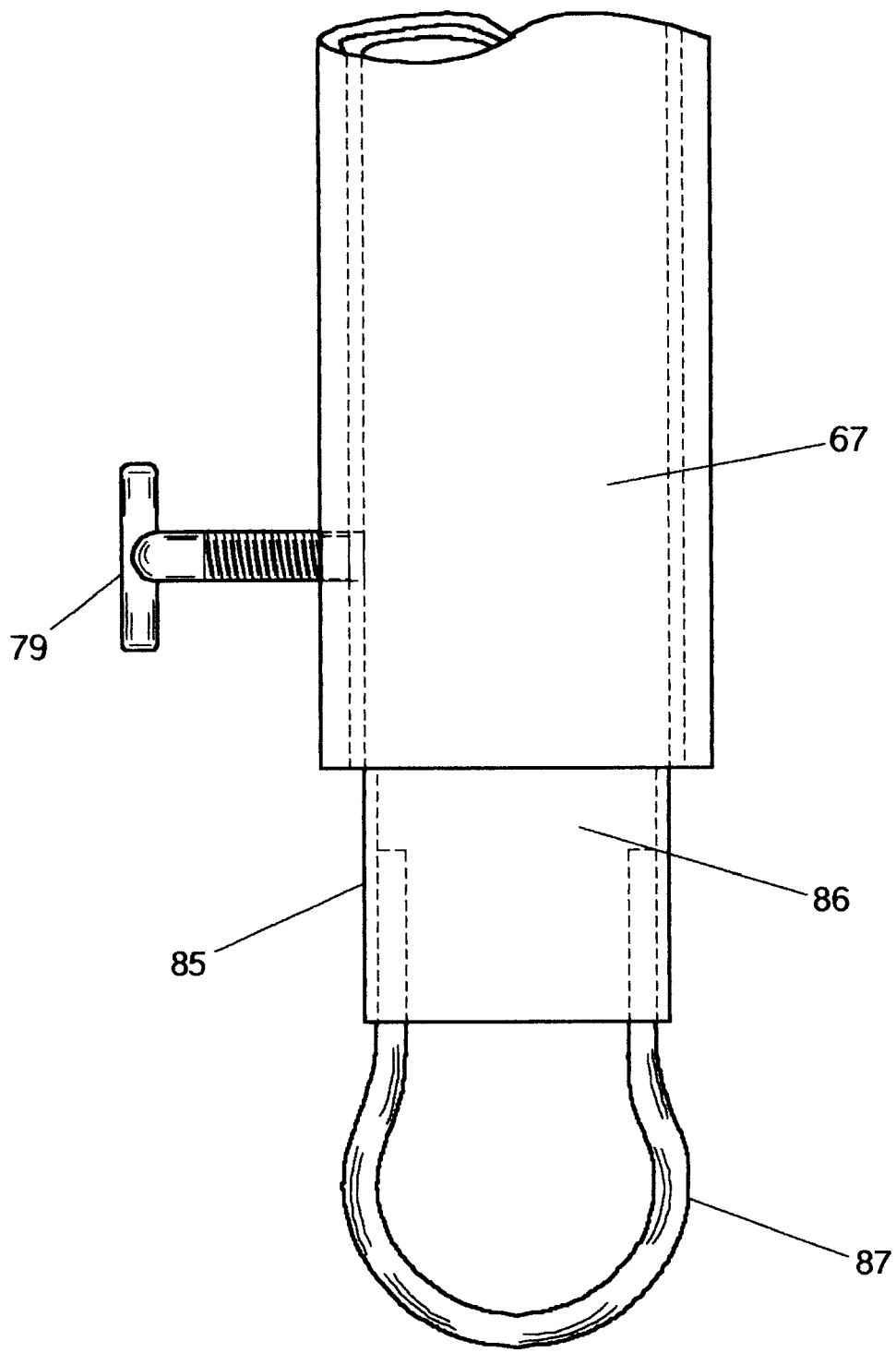
FIG. 7 is a front view a noose holder for use with a rigid dog grooming restraint according to an alternate preferred embodiment of the present invention.

Referring now to FIGS. 1–3, illustrated is a rigid dog grooming restraint 10. The rigid dog grooming restraint 10 is secured to opposite ends of a grooming table 11 via C-clamps 12. End support bar sleeves 15 are attached to each C-clamp 12 and are used to support a left end support bar 16 and a right end support bar 17 vertically, oriented perpendicular to the surface of the grooming table 11. Each end support bar sleeve 15 consists of a short tubular member whose inside diameter is slightly larger than the outside diameter of the left end support bar 16 and the right end support bar 17, allowing them to be inserted into and slide freely within the end support bar sleeves 15. An end support bar locking handle 18, consisting of a threaded connector (not shown) with a T-shaped handle, is inserted through the wall of each end support bar sleeve 15 in a direction perpendicular to the longitudinal axis thereof. By turning the end support bar locking handle 18, the threaded portion enters the interior cavity of the end support bar sleeve 15, creating a friction fit with the left end support bar 16 and the right end support bar 17, thus securing them in place. Accordingly, the height of the left end support bar 16 and the right end support bar 17 is adjustable using the end support bar locking handles 18 to secure them at the desired level.

A left traversing support bar sleeve 20 is attached to the top end of the left end support bar 16 in a position perpendicular to the longitudinal axis of the left end support bar 16. The inside diameter of the left traversing support bar sleeve 20 is slightly larger than the outside diameter of a left traversing support bar 21, allowing the left traversing support bar 21 to be inserted into and slide freely within the left traversing support bar sleeve 20. A left traversing support bar sleeve locking handle 22, consisting of a threaded connector (not shown) with a T-shaped handle, is inserted through the wall of the left traversing support bar sleeve 20 in a direction perpendicular to the longitudinal axis thereof. By turning the left traversing support bar sleeve locking handle 22, the threaded portion enters the interior cavity of the left traversing support bar sleeve 20, creating a friction fit with the left traversing support bar 21, thus securing it in place.

A right traversing support bar sleeve 25 is attached to the top end of the right end support bar 17 in a position perpendicular to the longitudinal axis of the right end support bar 17. The inside diameter of a right traversing support bar sleeve 25 is slightly larger than the outside diameter of the right traversing support bar 26, allowing the right traversing support bar 26 to be inserted into and slide freely within the right traversing support bar sleeve 25. A right traversing support bar sleeve locking handle 27, consisting of a threaded connector (not shown) with a T-shaped handle, is inserted through the wall of the right traversing support bar sleeve 25 in a direction perpendicular to the longitudinal axis thereof. By turning the right traversing support bar sleeve locking handle 27, the threaded portion enters the interior cavity of the right traversing support bar sleeve 25, creating a friction fit with the right traversing support bar 26, thus securing it in place.

The inside diameter of the left traversing support bar 21 is of a size so as to accept the outside diameter of the right traversing support bar 26, allowing it to be inserted into and slide freely within the left traversing support bar 21. A left traversing support bar locking handle 30, consisting of a threaded connector (not shown) with a T-shaped handle, is inserted through the wall of the left traversing support bar 21 in a direction perpendicular to the longitudinal axis thereof. By turning the left traversing support bar locking handle 30, the threaded portion enters the interior cavity of the left traversing support bar 21, creating a friction fit with the right traversing support bar 26, thus securing the right traversing support bar 26 within the left traversing support bar 21.

Accordingly, the horizontal position of the left traversing support bar 21 and the horizontal position of the right traversing support bar 26 are adjustable in relation to one another using the left traversing support bar sleeve locking handle 22, the right traversing support bar sleeve locking handle 27, and the left traversing support bar locking handle 30 in conjunction with one another.

A haunch-chest holder support 35 consists of a haunch-chest holder telescoping/radial adjustment sleeve 36 and a haunch-chest holder linear/radial adjustment sleeve 37. The haunch-chest holder telescoping/radial adjustment sleeve 36 and the haunch-chest holder linear/radial adjustment sleeve 37 consist of short tubular members attached to one another in a perpendicular orientation.

The inside diameter of the haunch-chest holder linear/radial adjustment sleeve 37 is slightly larger than the outside diameter of the left traversing support bar 21, allowing the haunch-chest holder linear/radial adjustment sleeve 37 to slide freely over the left traversing support bar 21. A haunch-chest holder linear/radial adjustment sleeve locking handle 38, consisting of a threaded connector (not shown) with a T-shaped handle, is inserted through the wall of the haunch-chest holder linear/radial adjustment sleeve 37 in a direction perpendicular to the longitudinal axis thereof. By turning the haunch-chest holder linear/radial adjustment sleeve locking handle 38, the threaded portion enters the interior cavity of the haunch-chest holder linear/radial adjustment sleeve 37, creating a friction fit with the left traversing support bar 21, thus securing them in place.

The inside diameter of the haunch-chest holder telescoping/radial adjustment sleeve 36 is slightly larger than the outside diameter of a haunch-chest holder support bar 39, allowing the haunch-chest holder support bar 39 to be inserted into and slide freely within the haunch-chest holder telescoping/radial adjustment sleeve 36. A haunch-chest holder telescoping/radial adjustment sleeve locking handle 40, consisting of a threaded connector (not shown)

with a T-shaped handle, is inserted through the wall of the haunch-chest holder telescoping/radial adjustment sleeve 36 in a direction perpendicular to the longitudinal axis thereof. By turning the haunch-chest holder telescoping/radial adjustment sleeve locking handle 40, the threaded portion enters the interior cavity of the haunch-chest holder telescoping/radial adjustment sleeve 36, creating a friction fit with the haunch-chest holder support bar 39, thus securing them in place.

The haunch-chest holder support 35 can be adjusted linearly along and radially about the left traversing support bar 21 by loosening the haunch-chest holder linear/radial adjustment sleeve locking handle 38, adjusting the linear and radial position of the haunch-chest holder support 35, and tightening the haunch-chest holder linear/radial adjustment sleeve locking handle 38. The telescoping and radial position of the haunch-chest holder support bar 39 can be adjusted by loosening the haunch-chest holder telescoping/radial adjustment sleeve locking handle 40, adjusting the telescoping and radial position of the haunch-chest holder support bar 39, and tightening the haunch-chest holder telescoping/radial adjustment sleeve locking handle 40.

A haunch-collar holder support 45 consists of a haunch-collar holder telescoping/radial adjustment sleeve 46 and a haunch-collar holder linear/radial adjustment sleeve 47. The haunch-collar holder telescoping/radial adjustment sleeve 46 and the haunch-collar holder linear/radial adjustment sleeve 47 consist of short tubular members attached to one another in a perpendicular orientation.

The inside diameter of the haunch-collar holder linear/radial adjustment sleeve 47 is slightly larger than the outside diameter of the right traversing support bar 26, allowing the haunch-collar holder linear/radial adjustment sleeve 47 to slide freely over the right traversing support bar 26. A haunch-collar holder linear/radial adjustment sleeve locking handle 48, consisting of a threaded connector (not shown) with a T-shaped handle, is inserted through the wall of the haunch-collar holder linear/radial adjustment sleeve 47 in a direction perpendicular to the longitudinal axis thereof. By turning the haunch-collar holder linear/radial adjustment sleeve locking handle 48, the threaded portion enters the interior cavity of the haunch-collar holder linear/radial adjustment sleeve 47, creating a friction fit with the right traversing support bar 26, thus securing them in place.

The inside diameter of the haunch-collar holder telescoping/radial adjustment sleeve 46 is slightly larger than the outside diameter of a haunch-collar holder support bar 49, allowing the haunch-collar holder support bar 49 to be inserted into and slide freely within the haunch-collar holder telescoping/radial adjustment sleeve 46. A haunch-collar holder telescoping/radial adjustment sleeve locking handle 50, consisting of a threaded connector (not shown) with a T-shaped handle, is inserted through the wall of the haunch-collar holder telescoping/radial adjustment sleeve 46 in a direction perpendicular to the longitudinal axis thereof. By turning the haunch-collar holder telescoping/radial adjustment sleeve locking handle 50, the threaded portion enters the interior cavity of the haunch-collar holder telescoping/radial adjustment sleeve 46, creating a friction fit with the haunch-collar holder support bar 49, thus securing them in place.

The haunch-collar holder support 45 can be adjusted linearly along, and radially about, the right traversing support bar 26 by loosening the haunch-collar holder linear/radial adjustment sleeve locking handle 48, adjusting the linear and radial position of the haunch-collar holder support 45, and tightening the haunch-collar holder linear/radial adjustment sleeve locking handle 48. The telescoping and radial position of the haunch-collar holder support bar 49 can be adjusted by loosening the haunch-collar holder telescoping/radial adjustment sleeve locking handle 50, adjusting the telescoping and radial position of the haunch-collar holder support bar 49, and tightening the haunch-collar holder telescoping/radial adjustment sleeve locking handle 50.

Referring now to FIGS. 1–6, further illustrated is a rigid dog grooming restraint 10. A haunch-chest holder 55 consists of a haunch-chest holder support bar 39 and a haunch-chest holder frame 56. The haunch-chest holder frame 56 is arcuate in profile so as to accept and support a dog's back at either the haunch or chest position. A haunch-chest holder frame pad 57 attached to the haunch-chest holder frame 56 and provides a comfortable fit between the haunch-chest holder frame 56 and the animal. Strapping apertures 58, in conjunction with a strap aperture securing post 60 provide a means by which a securing strap 59 can be attached to the haunch-chest holder frame 56 and used to secure a dog therein via strap eyelets, a buckle, or a hook and loop fastening means (not shown).

A haunch-collar holder 65 consists of a haunch-collar holder support bar 49, a haunch-collar holder angular adjustment joint 66, a haunch-collar holder angular sleeve 67, a haunch-collar holder extension rod 68 and a haunch-collar holder frame 69. The haunch-collar holder frame 69 is arcuate in profile so as to accept and support a dog's back at either the haunch or neck position. A haunch-collar holder frame pad 70 is attached to the haunch-collar holder frame 69 and provides a comfortable fit between the haunch-collar holder frame 69 and the animal. Strapping apertures 58, in conjunction with a strap aperture securing post 60 provide a means by which a securing strap 59 can be attached to the haunch-collar holder frame 69 and used to secure a dog therein via strap eyelets, a buckle, or a hook and loop fastening means (not shown).

The haunch-collar holder angular adjustment joint 66 consists of an angular adjustment disc 75 pivotally supported between two angular adjustment supports 76. A haunch-collar holder angular adjustment locking handle 77, consisting of a threaded connector (not shown) with a T-shaped handle, is inserted through the wall of the haunch-collar holder support bar base 78. By turning the haunch-collar holder angular adjustment locking handle 77, the threaded portion enters the interior portion of the haunch-collar holder angular adjustment joint 66, creating a friction fit with the angular adjustment disc 75, thus securing it in place.

The inside diameter of the haunch-collar holder angular sleeve 67 is slightly larger than the outside diameter of a haunch-collar holder extension rod 68, allowing the haunch-collar holder extension rod 68 to be inserted into and slide freely within the haunch-collar holder angular sleeve 67. A haunch-collar holder angular sleeve locking handle 79, consisting of a threaded connector (not shown) with a T-shaped handle, is inserted through the wall of the haunch-collar holder angular sleeve 67 in a direction perpendicular to the longitudinal axis thereof. By turning the haunch-collar holder angular sleeve locking handle 79, the threaded portion enters the interior cavity of the haunch-collar holder angular sleeve 67, creating a friction fit with the haunch-collar holder extension rod 68, thus securing them in place.

Referring now to FIGS. 1–7, in an alternate embodiment, a noose holder 85 replaces the haunch-collar holder extension rod 68 in the haunch-collar holder angular sleeve 67. The noose holder 85 consists of a noose holder support bar 86 with a noose holder ring 87 secured to the end thereof. The inside diameter of the haunch-collar holder angular sleeve 67 is slightly larger than the outside diameter of the noose holder support bar 86, allowing the noose holder support bar 86 to be inserted into and slide freely within the haunch-collar holder angular sleeve 67. The noose holder can be locked in place using the haunch-collar holder angular sleeve locking handle 79, in a manner similar to that used to secure the haunch-collar holder support bar 49, creating a friction fit between the haunch-collar holder angular sleeve locking handle 79 and the noose holder support bar 86.

The positioning of the noose holder 85 can be adjusted in the same, aforementioned manner as that of the haunch-collar holder frame 69, using the combined functionality of the haunch-collar holder linear/radial adjustment sleeve locking handle 48, the haunch-collar holder telescoping/radial adjustment sleeve locking handle 50, the haunch-collar holder angular adjustment locking handle 77, and the haunch-collar holder angular sleeve locking handle 79. The telescoping and radial position of the noose holder support bar 86 can be adjusted by loosening the haunch-collar holder angular sleeve locking handle 79, adjusting the telescoping and radial position of the noose holder support bar 86, and tightening the haunch-collar holder angular sleeve locking handle 79.

2. Operation of the Preferred Embodiment

In accordance with a preferred embodiment of the present invention, as shown in FIGS. 1–6, the rigid dog grooming restraint 10 is used in the following manner:

The rigid dog grooming restraint 10 is secured to a grooming table 11 using the C-clamps 12. The overall width of the rigid dog grooming restraint 10 is determined in accordance with the size of the particular table being used. Once the left end support bar 16 and the right end support bar 17 are secured to the table, the left traversing support bar 21 and the right traversing support bar 26 are inserted into the left traversing support bar sleeve 20 and the right traversing support bar sleeve 25, respectively. Using the left traversing support bar sleeve locking handle 22, the right traversing support bar sleeve locking handle 27, and the left traversing support bar locking handle 30, the width of the rigid dog grooming restraint is adjusted and locked into place.

The height of the left traversing support bar 21 and the right traversing support bar 26 is adjusted in accordance with the size of the dog being groomed using the end support bar locking handles 18 to lock the left end support bar 16 and the right end support bar 17 in the appropriate position, so as to force the animal to either stand, sit, or lie down. The fine adjustments for the height of the animal are made with the haunch-chest holder support bar 39 and the haunch-collar holder support bar 49, using the haunch-chest holder telescoping/radial adjustment sleeve locking handle 40 and the haunch-collar holder telescoping/radial adjustment sleeve locking handle 50. Adjustments for the length of the animal are made by sliding the haunch-chest holder support 35 and the haunch-collar holder support 45 into position and locking them using the haunch-chest holder linear/radial adjustment sleeve locking handle 38 and the haunch-collar holder linear/radial adjustment sleeve locking handle 48. Angular adjustments for the haunch-collar holder frame 69 are made by using the haunch-collar holder angular adjustment locking handle 77. The noose holder 85 is adjusted angularly using the haunch-collar holder angular adjustment locking handle 77, and vertically and axially using the haunch-collar holder telescoping/radial adjustment sleeve locking handle 50.

Once the animal is positioned on the grooming table 11, the general positioning of the rigid dog grooming restraint 10 components is adjusted in the following manner: The linear position of the haunch-chest holder 55 is adjusted using the haunch-chest holder linear/radial adjustment sleeve locking handle 38 to lock it in the appropriate position. The linear position of the haunch-collar holder 65 is adjusted using the haunch-collar holder linear/radial adjustment sleeve locking handle 48 to lock it in the appropriate position.

The general configuration having been set, finely tuned positioning of the rigid dog grooming restraint 10 is achieved in the following manner: The haunch-chest holder 55 is adjusted to secure and support the dog's haunch or chest areas using the haunch-chest holder linear/radial adjustment sleeve locking handle 38 and the haunch-chest holder telescoping/radial adjustment sleeve locking handle 40 to fit the exact height and position of the animal. The haunch-collar holder 65 is adjusted to secure and support the dog's haunch or collar areas using the haunch-collar holder linear/radial adjustment sleeve locking handle 48 and the haunch-collar holder telescoping/radial adjustment sleeve locking handle 50 to fit the exact height and position of the animal. The haunch-collar holder 65 is further adjustable using the haunch-collar holder angular adjustment locking handle 77 and the haunch-collar holder angular sleeve locking handle 79.

Using the securing straps 59 to secure the animal in the haunch-chest holder 55 and the haunch-collar holder 65, the rigid dog grooming restraint 10 can be used to stabilize the dog's haunch, chest and neck in any pair combination.

Once secured in the restraint, the positioning of the dog can be further adjusted in several manners: When secured by a single holder, i.e. either the haunch-chest holder 55 or the haunch-collar holder 65, the position of the animal can be rotated 360 degrees, using the haunch-chest holder telescoping/radial adjustment sleeve locking handle 40 or the haunch-collar holder telescoping/radial adjustment sleeve locking handle 50, respectively. When secured by both the haunch-chest holder 55 and the haunch-collar holder 65, the position of the animal can be moved closer to either longitudinal edge of the grooming table 11 or rotated slightly, using the haunch-chest holder telescoping/radial adjustment sleeve locking handle 40 and the haunch-collar holder telescoping/radial adjustment sleeve locking handle 50 in conjunction with the haunch-chest holder linear/radial adjustment sleeve locking handle 38 and the haunch-collar holder linear/radial adjustment sleeve locking handle 48.

In accordance with an alternate embodiment of the present invention, as shown in FIGS. 1–7, when rigid stability is not critical, the noose holder 85 can be used to anchor a noose-type collar with which to secure the dog. The noose holder 85 is adjusted to secure and support the dog's neck via a noose-type grooming device using the haunch-collar holder angular sleeve locking handle 79 in conjunction with the haunch-collar holder telescoping/radial adjustment sleeve locking handle 50 to fit the exact height and position of the animal.

While the preferred embodiments of the invention have been shown, illustrated, and described, it will be apparent to those skilled in this field that various modifications may be made in these embodiments without departing from the spirit of the present invention. It is for this reason that the scope of the invention is set forth in and is to be limited only by the following claims.

What is claimed is:

1. A rigid dog grooming restraint used to secure a dog in a stationary position on a grooming table while performing grooming operations, said rigid dog grooming restraint comprising:

a first vertical frame member adapted to be secured to a grooming table so as to be vertically adjustable, said first vertical frame member having a first cross-member sleeve mounted to the top thereof;

a second vertical frame member adapted to be secured to a grooming table opposite said first vertical frame member so as to be vertically adjustable, said second vertical frame member having a second cross-member sleeve mounted to the top thereof;

a frame cross-member adapted to be telescopically adjustable between said first vertical frame member and said second vertical frame member, said frame cross-member adjustably attached to said first cross-member sleeve and said second cross-member sleeve and supported by said first vertical frame member and said second vertical frame member;

a haunch-chest holder attached to and supported by said frame cross-member, said haunch-chest holder adapted to be vertically adjustable and rotatably adjustable;

a haunch-collar holder attached to and supported by said frame cross-member, said haunch-collar holder adapted to be vertically adjustable, rotatably adjustable, and angularly adjustable; and a noose holder attached to and supported by said frame cross-member, said noose holder adapted to be vertically adjustable and rotatably adjustable.

2. The rigid dog grooming restraint of claim 1, wherein said haunch-chest holder further comprises a U-shaped body restraining means, adjustably connected to said frame cross-member via a haunch-chest holder support rod, for engaging an animal's body from a position above the animal at the chest or haunch area, said haunch-chest holder having a haunch-chest holder strap attached thereto with a securing means, selected from the group comprising buckles, eyelet posts and hook and loop fastening devices, used to restrain the animal therein.

3. The rigid dog grooming restraint of claim 2, wherein said haunch-chest holder is supported from said frame cross-member by a haunch-chest holder support sleeve consisting of a tubular sleeve slidably attached to said frame cross-member, allowing linear and rotational adjustments of said haunch-chest holder support sleeve thereon, said haunch-chest holder support sleeve having a haunch-chest holder support rod sleeve consisting of a tubular sleeve attached thereto in an orientation perpendicular to the longitudinal axis of said haunch-chest holder support sleeve, said haunch-chest holder support rod slidably inserted in said haunch-chest holder support rod sleeve, so as to allow linear and rotational adjustments of said haunch-chest holder therein.

4. The rigid dog grooming restraint of claim 1, wherein said haunch-collar holder further comprises a U-shaped body restraining means, adjustably connected to said frame cross-member via a haunch-collar holder support rod, for engaging an animal's body from a position above the animal at the neck or haunch area, said haunch-collar holder having a haunch-collar holder strap attached thereto with a securing means, selected from the group comprising buckles, eyelet posts and hook and loop fastening devices, used to restrain the animal therein.

5. The rigid dog grooming restraint of claim 4, wherein said haunch-collar holder support rod further comprises a support segment pivotally attached to a holder segment, allowing adjustment of the angular position of said support segment in relation to said holder segment, said U-shaped body restraining means of said haunch-collar holder is connected to said holder segment at the end opposite said pivotal attachment.

6. The rigid dog grooming restraint of claim 5, wherein said haunch-collar holder is supported from said frame cross-member by a haunch-collar holder support sleeve consisting of a tubular sleeve slidably attached to said frame cross-member, allowing linear and rotational adjustments of said haunch-collar support sleeve thereon, said haunch-collar holder support sleeve having a haunch-collar holder support rod sleeve consisting of a tubular sleeve attached thereto in an orientation perpendicular to the longitudinal axis of said haunch-collar holder support sleeve, said support segment of said haunch-collar holder support rod slidably inserted in said haunch-collar holder support rod sleeve, so as to allow linear and rotational adjustments of said haunch-collar holder therein.

7. The rigid dog grooming restraint of claim 1, wherein said noose holder further comprises an eyelet, adjustably connected to said frame cross-member via a noose holder support rod, providing a means by which to restrain an animal with a device selected from the group comprising nooses, leashes and chokers.

* * * * *